(12) United States Patent
Ishida et al.

(10) Patent No.: US 12,440,973 B2
(45) Date of Patent: Oct. 14, 2025

(54) INFORMATION PROCESSING DEVICE, INFORMATION PROCESSING METHOD, AND STORAGE MEDIUM

(71) Applicant: TOYOTA JIDOSHA KABUSHIKI KAISHA, Toyota (JP)

(72) Inventors: Yutaro Ishida, Toyota (JP); Taro Takahashi, Urayasu (JP); Naoki Mima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 284 days.

(21) Appl. No.: 18/101,813

(22) Filed: Jan. 26, 2023

(65) Prior Publication Data

US 2023/0330849 A1   Oct. 19, 2023

(30) Foreign Application Priority Data

Apr. 13, 2022  (JP) .................................. 2022-066290

(51) Int. Cl.
*B25J 9/16*  (2006.01)
*B25J 13/08*  (2006.01)

(52) U.S. Cl.
CPC ............ *B25J 9/1633* (2013.01); *B25J 9/161* (2013.01); *B25J 13/085* (2013.01)

(58) Field of Classification Search
CPC ......... B25J 9/1633; B25J 9/161; B25J 13/085
See application file for complete search history.

(56) References Cited

U.S. PATENT DOCUMENTS

| 11,461,589 | B1 * | 10/2022 | Bai ........................ G06N 3/08 |
| 2020/0130193 | A1 | 4/2020 | Takahashi et al. |
| 2020/0376681 | A1 * | 12/2020 | Ohnishi ................. G05B 19/42 |
| 2021/0107157 | A1 * | 4/2021 | Bai ........................ B25J 9/1692 |
| 2022/0032451 | A1 * | 2/2022 | Choi ...................... B25J 13/006 |
| 2023/0001580 | A1 * | 1/2023 | Spenninger ............ B25J 9/1656 |
| 2023/0286170 | A1 * | 9/2023 | Namba ............... G05B 19/4182 |

FOREIGN PATENT DOCUMENTS

| CN | 112025708 A * 12/2020 ............ B25J 9/1602 |
| JP | 4523501 B2   8/2010 |
| JP | 6587195 B2   10/2019 |

OTHER PUBLICATIONS

Machine translation for CN112025708 (Year: 2020).*
Namiko Saito et al. "How To Select and Use Tools? Active Perception of Target Objects Using Multimodal Deep Learning". Jun. 4, 2021.

* cited by examiner

*Primary Examiner* — Mohamad O El Sayah
(74) *Attorney, Agent, or Firm* — Oliff PLC (57) ABSTRACT

An information processing device is provided that includes an acquisition unit that acquires information indicating a force generated between a first tool and an object in a trial motion using the first tool by a robot, and an estimation unit that estimates information of executing a specific task using the first tool based on the information acquired by the acquisition unit and information indicating a force generated between a specific tool and the object in the specific task using the specific tool.

9 Claims, 5 Drawing Sheets

| TASK ID | TASK | INFORMATION INDICATING PREDETERMINED TOOL USED IN TASK | INFORMATION INDICATING FORCE GENERATED BETWEEN PREDETERMINED TOOL AND OBJECT BY TASK | MOTION INFORMATION OF PREDETERMINED TOOL | MOTION INFORMATION OF ROBOT 20 |
|---|---|---|---|---|---|
| TASK A | HAMMERING NAIL | INFORMATION OF PREDETERMINED HAMMER | FORCE INFORMATION A | MOTION INFORMATION A1 | MOTION INFORMATION A2 |
| TASK B | HITTING PEST | INFORMATION OF PREDETERMINED SLIPPER | FORCE INFORMATION B | MOTION INFORMATION B1 | MOTION INFORMATION B2 |
| ... | ... | ... | ... | ... | ... |

INFORMATION PROCESSING DEVICE, INFORMATION PROCESSING METHOD, AND STORAGE MEDIUM

CROSS-REFERENCE TO RELATED APPLICATION

This application claims priority to Japanese Patent Application No. 2022-066290 filed on Apr. 13, 2022, incorporated herein by reference in its entirety.

BACKGROUND

1. Technical Field

The present disclosure relates to an information processing device, an information processing method, and a storage medium.

2. Description of Related Art

Japanese Patent No. 4523501 (JP 4523501 B) discloses a technique for suggesting a suitable alternative tool that can provide a desired tool motion.

SUMMARY

However, in the related art, for example, there are cases where a tool different in shape and the like from the desired tool cannot be proposed as an alternative tool.

An object of the present disclosure is to provide a technique capable of estimating a suitable alternative tool.

A first aspect of the present disclosure provides an information processing device including an acquisition unit that acquires information indicating a force generated between a first tool and an object in a trial motion using the first tool by a robot, and an estimation unit that estimates information of executing a specific task using the first tool based on the information acquired by the acquisition unit and information indicating a force generated between a specific tool and the object in the specific task using the specific tool.

A second aspect of the present disclosure provides an information processing method including acquiring information indicating a force generated between a first tool and an object in a trial motion using the first tool by a robot, and estimating information of executing a specific task using the first tool based on the acquired information and information indicating a force generated between a specific tool and the object in the specific task using the specific tool.

A third aspect of the present disclosure provides a storage medium storing a program that causes a computer to execute processes including acquiring information indicating a force generated between a first tool and an object in a trial motion using the first tool by a robot, and estimating information of executing a specific task using the first tool based on the acquired information and information indicating a force generated between a specific tool and the object in the specific task using the specific tool.

A fourth aspect of the present disclosure provides a trained model for causing a computer to execute a process of estimating information of executing a specific task using a first tool based on information indicating a force generated between the first tool and an object in a trial motion using the first tool by a robot and information indicating a force generated between a specific tool and the object in the specific task using the specific tool.

According to one aspect, a suitable alternative tool can be estimated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The principle of the present disclosure will be described with reference to several exemplary embodiments. It should be understood that the embodiments are described for illustrative purposes only, and do not imply any limitation on the scope of the present disclosure, and are intended to assist those skilled in the art in understanding and practicing the present disclosure. The disclosure described herein can be implemented in various ways other than those described below.

In the following description and claims, unless defined otherwise, all technical and scientific terms used herein have the same meaning as commonly understood by those skilled in the art to which the present disclosure belongs. Hereinafter, the embodiments of the present disclosure will be described with reference to the drawings.

System Configuration

Figure 1:
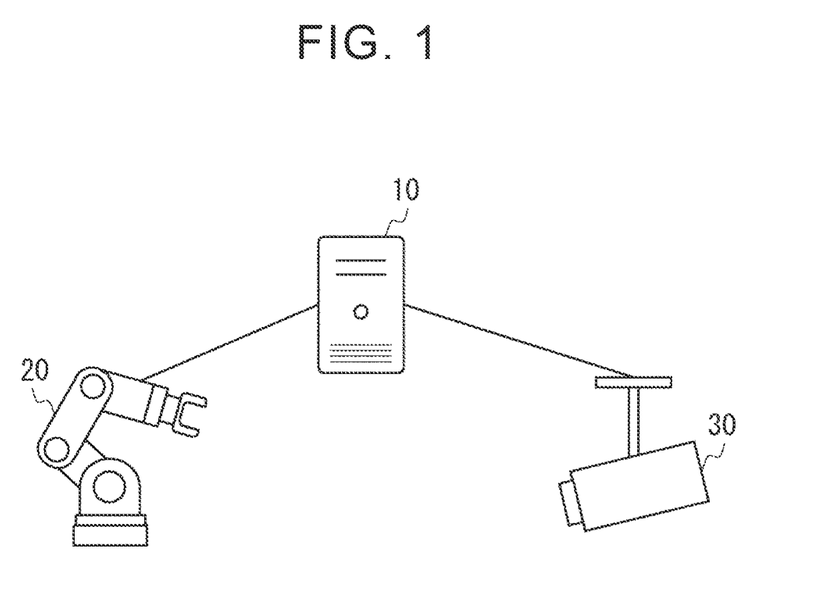
FIG. 1 is a diagram showing an example of a configuration of an information processing system according to an embodiment.

A configuration of an information processing system 1 according to an embodiment will be described with reference to FIG. 1. FIG. 1 is a diagram showing an example of the configuration of the information processing system 1 according to the embodiment. In the example of FIG. 1, the information processing system 1 includes an information processing device 10, a robot (an example of an "external device") 20, and a sensor 30.

The information processing device 10 may be, for example, a device that controls the robot 20 using artificial intelligence (AI). The information processing device acquires (measures, calculates) information indicating a force generated between an alternative tool and an object in a motion of attempting to execute a specific task using the alternative tool. Then, the information processing device 10 estimates information of executing the specific task using the alternative tool, based on the acquired information and information indicating a force generated between a specific tool registered in advance and the object in the specific task using the specific tool. Further, the information processing device 10 may cause the robot 20 to execute a motion of executing the specific task using the alternative tool based on the estimated information.

The robot 20 is a robot that executes tasks using an arm or the like. The robot 20 may be any device that can execute various tasks, and the external shape is not limited. The robot 20 can be used for various purposes such as home use, search use, and factory use. The sensor 30 is a sensor that measures the surroundings of the robot 20. The sensor 30 may be, for example, a force sensor, a camera, or a light detection and ranging (LiDAR) sensor. The force sensor is, for example, a sensor that measures magnitudes of forces and torques acting in a plurality of (for example, three axes) directions. The force sensor may be, for example, a piezoelectric, electrical resistance (strain gauge), or capacitive force sensor.

The number of information processing devices 10, robots 20, and sensors is not limited to that in the example in FIG. 1. The information processing device 10 and the sensor 30 may be housed inside a housing of the robot 20.

Hardware Configuration

Figure 2:
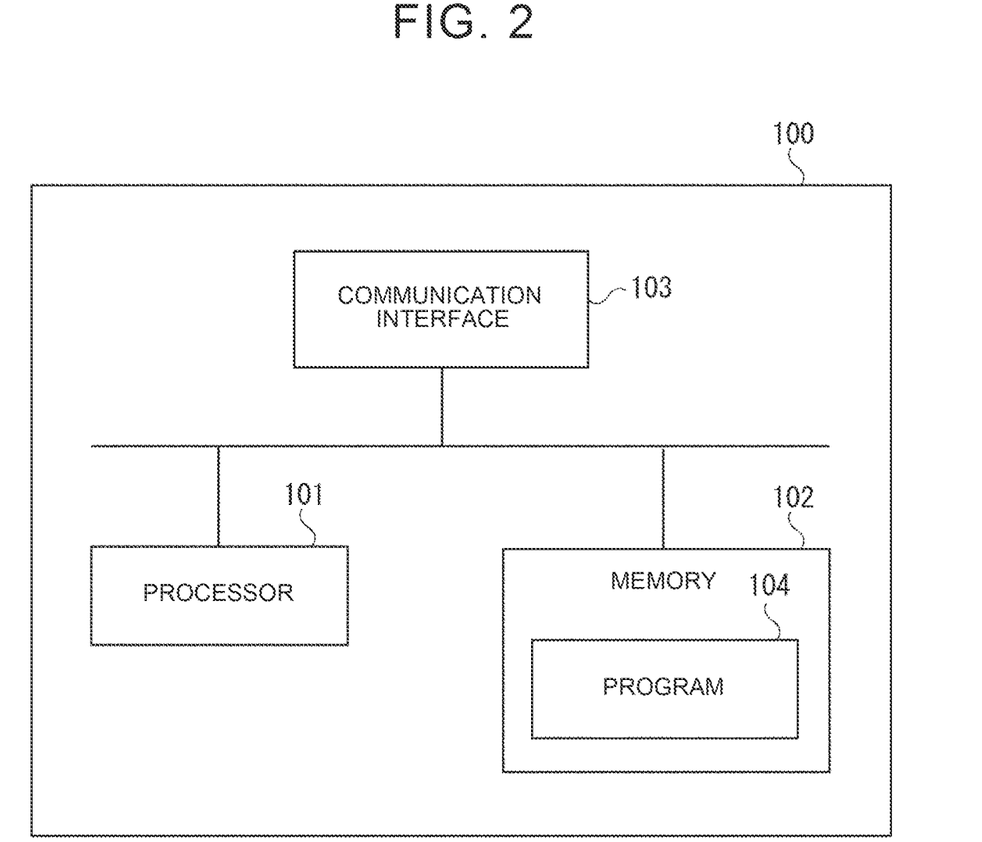
FIG. 2 is a diagram showing a hardware configuration example of an information processing device according to the embodiment.

FIG. 2 is a diagram showing a hardware configuration example of the information processing device 10 according to the embodiment. In the example of FIG. 2, the information processing device 10 (computer 100) includes a processor 101, a memory 102, and a communication interface 103. These units may be connected by a bus or the like. The memory 102 stores at least a portion of a program 104. The communication interface 103 includes an interface necessary for communication with other network elements.

When the program 104 is executed by cooperation of the processor 101 and the memory 102, etc., the computer 100 executes at least a part of the processes of the embodiments of the present disclosure. The memory 102 may be of any type suitable for a local technology network. The memory 102 may be, as a non-limiting example, a non-transitory computer-readable storage medium. Also, the memory 102 may be implemented using any suitable data storage technology, such as a semiconductor-based memory device, a magnetic memory device and system, an optical memory device and system, a fixed memory and removable memory, and the like. Although only one memory 102 is shown in the computer 100, there may be several physically different memory modules in the computer 100. The processor 101 may be of any type. The processor 101 may include one or more of a general-purpose computer, a special purpose computer, a microprocessor, a digital signal processor (DSP), and a processor based on a multi-core processor architecture as a non-limiting example. The computer 100 may include a plurality of processors, such as an application specific integrated circuit chip that is temporally dependent on a clock that synchronizes the main processor.

Embodiments of the present disclosure may be implemented in hardware or dedicated circuitry, software, logic, or any combination thereof. Some aspects may be implemented in hardware, while other aspects may be implemented in firmware or software that may be executed by a controller, microprocessor or other computing devices.

The present disclosure also provides at least one computer program product tangibly stored on a non-transitory computer-readable storage medium. The computer program product includes computer-executable instructions, such as instructions contained in program modules, and is executed on a device on a target real or virtual processor to execute a process or a method of the present disclosure. The program modules include routines, programs, libraries, objects, classes, components, data structures, etc. that execute specific tasks or implement specific abstract data types. The functions of the program modules may be combined or split between program modules as desired in various embodiments. Machine-executable instructions for program modules can be executed within local or distributed devices. In the distributed devices, program modules can be located in both local and remote storage media.

Program codes for executing the method of the present disclosure may be written in any combination of one or more programming languages. The program codes are provided to a processor or a controller of a general-purpose computer, a special purpose computer, or other programmable data processing devices. When the program codes are executed by the processor or the controller, functions/motions in the flowcharts and/or implemented block diagrams are executed. The program codes are executed entirely on a machine, as a stand-alone software package, partly on a machine, partly on a remote machine, or entirely on a remote machine or a server.

The program is stored using various types of non-transitory computer-readable media, and can be supplied to a computer. The non-transitory computer-readable media include various types of tangible recording media. Examples of the non-transitory computer-readable media include magnetic recording media, magneto-optical recording media, optical disc media, semiconductor memories, and the like. The magnetic recording media include, for example, flexible disks, magnetic tapes, hard disk drives, and the like. The magneto-optical recording media include, for example, magneto-optical disks, and the like. The optical disc media include, for example, a Blu-ray disc, a compact disc read-only memory (CD-ROM), a compact disc recordable (CD-R), a compact disc rewritable (CD-RW), and the like. The semiconductor memories include, for example, a solid state drive, a mask read-only memory (ROM), a programmable ROM (PROM), an erasable PROM (EPROM), a flash ROM, and a random access memory (RAM). Further, the program may also be supplied to the computer by various types of transitory computer-readable media. Examples of the transitory computer-readable media include electrical signals, optical signals, and electromagnetic waves. The transitory computer-readable media can supply the program to the computer via a wired communication path such as an electric wire and an optical fiber, or a wireless communication path.

Configuration

Figure 3:
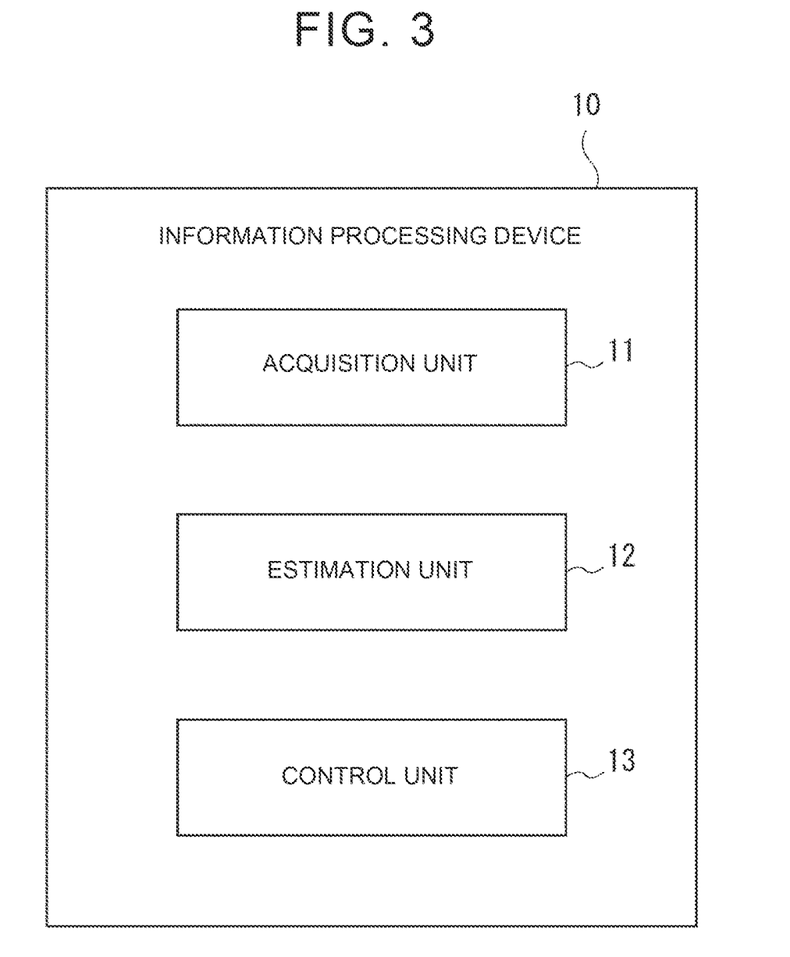
FIG. 3 is a diagram showing an example of a configuration of the information processing device according to the embodiment.

Next, a configuration of the information processing device 10 according to the embodiment will be described with reference to FIG. 3. FIG. 3 is a diagram showing an example of the configuration of the information processing device 10 according to the embodiment. In the example of FIG. 3, the information processing device 10 includes an acquisition unit 11, an estimation unit 12, and a control unit 13. Each of the units may be realized by cooperation of one or more programs installed in the information processing device 10 and hardware such as the processor 101 and the memory 102 of the information processing device 10.

The acquisition unit 11 acquires the information indicating the force generated between the alternative tool and the object in a trial motion using the alternative tool by the robot 20. The estimation unit 12 estimates the information of executing the specific task using the alternative tool, based on the information acquired by the acquisition unit 11 and the information indicating the force generated between a specific tool and the object in the specific task using the specific tool. The control unit 13 controls the robot 20 to execute the specific task using the alternative tool based on the information estimated by the estimation unit 12.

Process

Figure 4:
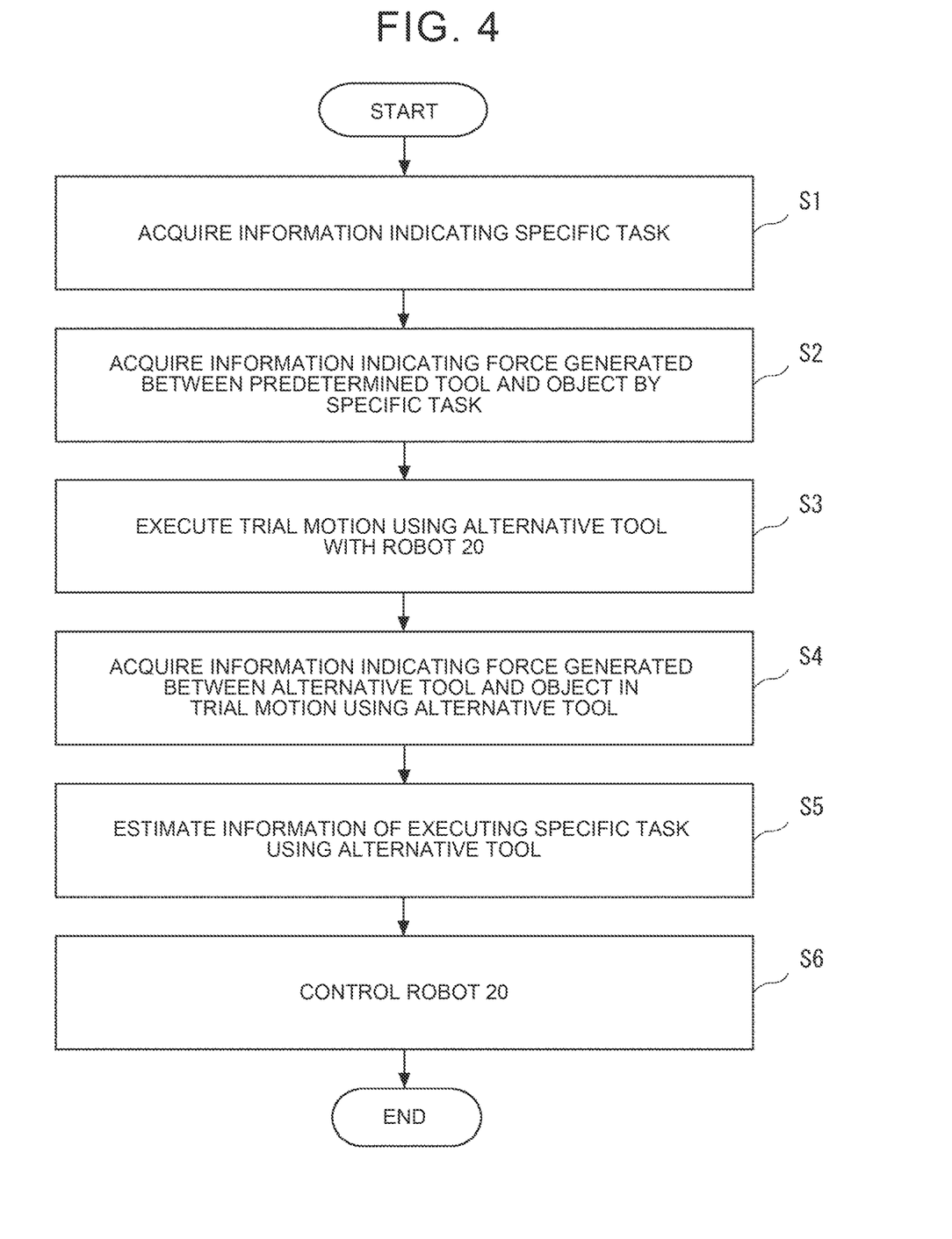
FIG. 4 is a flowchart showing an example of processes of the information processing device according to the embodiment.
Figure 5:
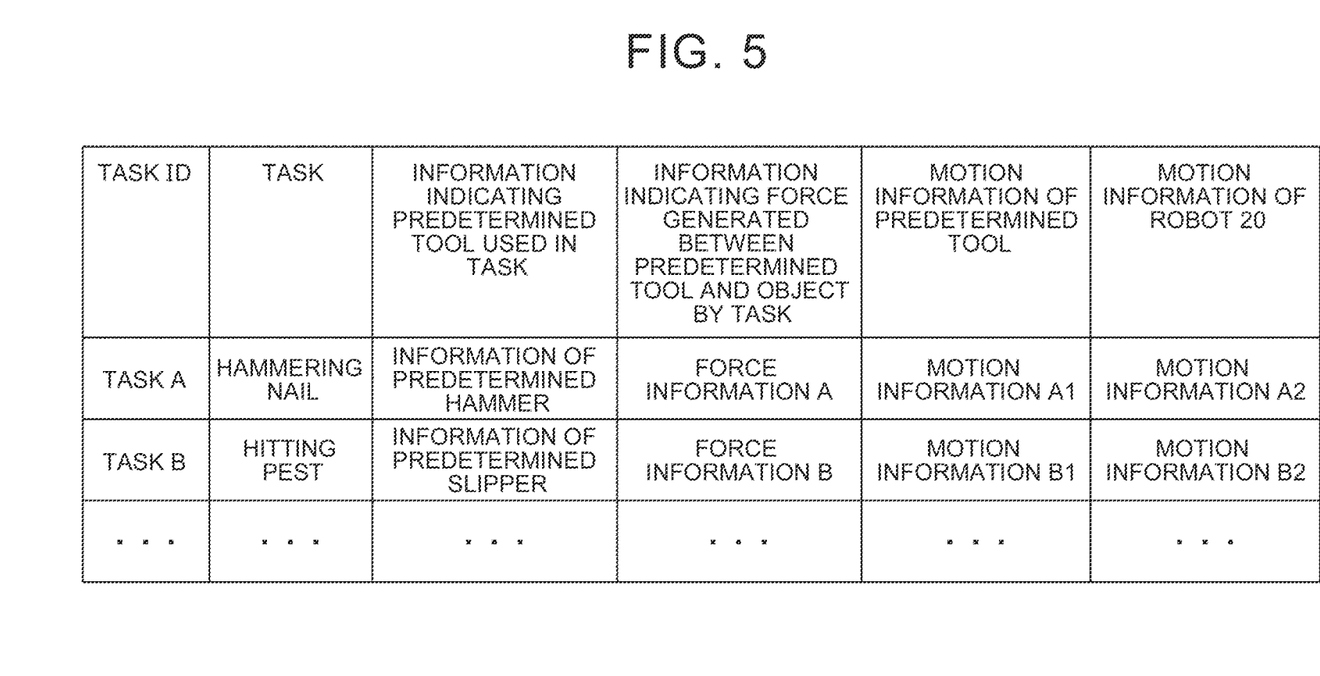
FIG. 5 is a diagram showing an example of a task database (DB) according to the embodiment.

Next, an example of processes of the information processing device 10 according to the embodiment will be described with reference to FIGS. 4 and 5. FIG. 4 is a flowchart showing an example of processes of the information processing device 10 according to the embodiment. FIG. 5 is a diagram showing an example of a task database (DB) 501 according to the embodiment.

In step S1, the acquisition unit 11 acquires information indicating a specific task that is a task executed by the robot 20 or the like using a tool. Here, the acquisition unit 11 may determine the specific task based on an instruction from a user, for example. In this case, for example, the acquisition unit 11 may recognize the voice of the user by AI or the like, and determine the specific task desired by the user. It should be noted that tasks executed using tools may include, for example, hammering a nail, hitting a pest, and the like.

Subsequently, the acquisition unit 11 acquires information indicating a force generated between a predetermined tool and an object by the specific task from the task DB 501 (step S2). The task DB 501 may be recorded in a storage device inside the information processing device 10 or may be recorded in a storage device outside the information processing device 10. In the example of FIG. 5, in association with a task ID, a task, information indicating the predetermined tool used in the task, information indicating the force generated between the predetermined tool and the object by the task, motion information of the predetermined tool, and motion information of the robot 20 are recorded in the task DB 501. The task ID is identification information of the task.

The information indicating the predetermined tool used in the task may include, for example, at least one of information indicating the label (name, for example) of the predetermined tool, the mass of the predetermined tool, and the shape of the predetermined tool.

The information indicating the force generated between the predetermined tool and the object by the task may include at least one of a force distribution map indicating the magnitude of the force generated at each part (each position) of the predetermined tool, a force vector map indicating the magnitude and direction of the force generated at each part of the predetermined tool, and a force peak value, when the predetermined tool collides with the object. The force distribution map and the force vector map may be, for example, maps in a polar coordinate system or maps in a rectangular coordinate system. The force distribution map and the force vector map may also be, for example, three-dimensional maps (point cloud) data in a rectangular coordinate system.

The motion information of the predetermined tool is information indicating a motion of the predetermined tool when the task is executed using the predetermined tool. The motion information of the predetermined tool may include, for example, at least one of the maximum speed of the predetermined tool, the speed at which the predetermined tool collides with the object (collision speed), and the time-series data of the speed of the predetermined tool.

The motion information of the robot 20 is information indicating a motion of the robot 20 when the robot 20 uses the predetermined tool to execute the task. Information in the task DB 501 may be registered in advance, for example, at the time of factory shipment, etc. Further, the information processing device 10 may record a record of a specific task in the task DB 501, for example, when the robot 20 has learned the specific task by imitation learning or the like.

Processes from step S3 to step S5 below may be executed for each of one or more alternative tools. In this case, the information processing device 10 may analyze an image captured by the sensor 30 that is a camera using a convolutional neural network (CNN), so that one or more objects that can be used as alternative tools are detected (estimated) out of a plurality of objects existing around the robot 20.

Subsequently, the control unit 13 causes the robot 20 to execute a trial motion (previous motion, preliminary motion) of a motion for executing the specific task using the alternative tool (step S3). The alternative tool is a tool other than the predetermined tool used in the specific task recorded in the task DB 501. The alternative tool and the predetermined tool may be the same type of tool (for example, a predetermined hammer and another hammer). When the predetermined tool is the predetermined hammer, the alternative tool may be, for example, another hammer, a wood hammer, a stone, a frying pan, and the like. Also, when the predetermined tool is a predetermined slipper, the alternative tool may be, for example, another slipper, rolled-up newspaper, a dustcloth, and the like.

As the trial motion, for example, the control unit 13 may cause the robot to execute, using the alternative tool, a motion that is smaller than the motion when the robot 20 executes the specific task using the predetermined tool. As a result, for example, when the specific task is a task of hammering a nail, a motion of lightly tapping a nail or the like with a stone is executed as a trial motion. In this case, for example, the control unit 13 may cause the arm of the robot 20 to grasp the alternative tool, and cause the robot 20 to execute a motion in which at least one of the speed and the movement distance is smaller than the motion according to the motion information recorded in the task DB 501.

Subsequently, the acquisition unit 11 acquires, for example, the information indicating the force generated between the alternative tool and the object in the trial motion using the alternative tool by the robot (step S4). Here, the acquisition unit 11 may calculate information indicating the alternative tool, the force generated between the alternative tool and the object, and motion information of the alternative tool, based on information measured by the sensor 30 that is a force sensor provided on the alternative tool. As a result, for example, information indicating a force that the stone receives from the nail when the nail is lightly tapped with the stone is acquired.

For example, the acquisition unit 11 may calculate the information indicating the alternative tool, the force generated between the alternative tool and the object, and the motion information of the alternative tool, based on information measured by the sensor 30 that is a force sensor provided on the robot 20. In this case, the sensor 30 may be provided on an arm other than the arm grasping the alternative tool, out of a plurality arms included in the robot 20. As a result, for example, the information indicating the force that the stone receives when the nail is lightly tapped with the stone is acquired.

For example, the acquisition unit 11 may calculate the information indicating the alternative tool, the force generated between the alternative tool and the object, and the motion information of the alternative tool, based on the information measured by the sensor 30 that is the force sensor provided on the robot 20, and the image (still image or moving image) captured by the sensor 30 that is a camera. In this case, the force sensor may be provided on an arm that grasps the alternative tool. As a result, for example, the information indicating the force received by the stone when the nail or the like is lightly tapped with the stone is calculated (estimated), based on the shape of the alternative tool recognized from the image and the information measured by the force sensor.

In addition, the acquisition unit 11 may execute a dynamics simulation based on an image (still image or moving image) captured by the sensor 30 that is a camera, for example, and calculate the information indicating the alternative tool, the force generated between the alternative tool and the object, and the motion information of the alternative tool. In this case, the acquisition unit 11 may calculate the force generated between the alternative tool and the object based on changes in the magnitude and direction of the force applied to the alternative tool, for example.

Subsequently, the estimation unit 12 estimates information of executing the specific task using the alternative tool (step S5), based on the information acquired by the acquisition unit 11 in the process of step S4, and the information indicating the force generated between the predetermined tool and the object in the specific task using the predetermined tool, etc.

Here, the estimation unit 12 may estimate the degree of similarity between the force generated between the predetermined tool and the object in the specific task using the predetermined tool, etc., and the force generated between the alternative tool and the object in the trial motion using the alternative tool, etc., as the information of executing the specific task using the alternative tool. As a result, for example, when the specific task is a task of hammering a nail, a stone having mechanical properties relatively similar to the predetermined hammer can be selected as the alternative tool rather than a frying pan having a shape relatively similar to the predetermined hammer. Also, for example, when the specific task is to hit a pest, rolled-up newspaper having mechanical properties relatively similar to the predetermined slipper can be selected as the alternative tool rather than a towel having a shape relatively similar to the predetermined slipper.

The estimation unit 12 may estimate (infer) the degree of similarity between the information indicating the force generated between the predetermined tool and the object in the specific task using the predetermined tool, and the information indicating the force generated between the alternative tool and the object in the trial motion, using the convolutional neural network (CNN). In this case, the estimation unit 12 may first reduce the number of dimensions of a map (image) that is a two-dimensional force distribution map or force vector map indicating the force generated between the alternative tool and the object, using a convolutional autoencoder. Further, the estimation unit 12 may input each layer of a three-dimensional force distribution map or force vector map indicating the force generated between the alternative tool and the object as two-dimensional data to the convolutional autoencoder, for example, and reduce the number of dimensions of the map.

Then, the estimation unit 12 may calculate the degree of similarity between the map of the force generated between the alternative tool and the object, in which the number of dimensions has been reduced, and the map recorded in the task DB 501 and included in the information indicating the force generated between the predetermined tool and the object by the task, using the convolutional neural network.

The estimation unit 12 may estimate the degree of similarity between: the information indicating the predetermined tool used in the task, the force generated between the predetermined tool and the object by the task, and the motion information of the predetermined tool; and the information indicating the alternative tool, the force generated between the alternative tool and the object in the trial motion, and the motion information of the alternative tool. In this case, the estimation unit 12 may input the following to a trained model: the degree of similarity between the information indicating the force generated between the predetermined tool and the object in the specific task using the predetermined tool, and the information indicating the force generated between the alternative tool and the object in the trial motion; the information indicating the alternative tool; and the motion information of the alternative tool. In this case, the trained model may be generated by, for example, machine learning such as a neural network (for example, multi-layer perceptron), a decision tree, or ensemble learning. The information indicating the alternative tool may include, for example, at least one of information indicating the label (name, for example) of the alternative tool, the mass of the alternative tool, and the shape of the alternative tool. The motion information of the alternative tool may include, for example, at least one of the maximum speed of the alternative tool in the trial motion, the speed at which the alternative tool collides in the trial motion, and the time-series data of the speed of the alternative tool in the trial motion.

Subsequently, the control unit 13 controls the robot 20 to execute the specific task using the alternative tool based on the information estimated by the estimation unit 12 (step S6). The information processing device 10 may execute the processes from step S3 to step S5 for each of the one or more alternative tools, and estimate (calculate) the degree of similarity for each alternative tool. Then, the control unit 13 may cause the robot to execute the specific task using the alternative tool with the highest degree of similarity.

Modification

The information processing device 10 may be a device included in one housing, but the information processing device 10 of the present disclosure is not limited to this. Each unit of the information processing device 10 may be realized by cloud computing including one or more computers, for example. Such information processing devices are also included in an example of the "information processing device" of the present disclosure.

The present disclosure is not limited to the above embodiment, and can be appropriately modified without departing from the spirit.

What is claimed is:

1. An information processing device comprising:
a processor configured to:
determine a specific task that is desired by a user by using artificial intelligence to recognize a voice instruction of the user,
acquire first information indicating a force generated between a first tool and an object in a trial motion in which a robot uses the first tool, and
estimate information that is used by the robot to execute the specific task using the first tool based on the first information that was acquired and second information indicating a force generated between a specific tool and the object in performing the specific task by the robot using the specific tool,
wherein the first tool is an alternative to the specific tool.

2. The information processing device according to claim 1, wherein the processor acquires the first information indicating the force generated between the first tool and the object in the trial motion using the first tool, the trial motion being a motion smaller than a motion performed when the robot executes the specific task using the specific tool.

3. The information processing device according to claim 1, wherein the information that is used by the robot to execute the specific task using the first tool includes information indicating a degree of similarity between the second information indicating the force generated between the specific tool and the object in performing the specific task by the robot using the specific tool and the first information indicating the force generated between the first tool and the object in the trial motion using the first tool.

4. The information processing device according to claim 1, wherein:
   the first information indicating the force generated between the first tool and the object in the trial motion using the first tool includes information indicating the force generated between the first tool and the object in two dimensions or three dimensions; and
   the processor estimates a degree of similarity between the second information indicating the force generated between the specific tool and the object in performing the specific task by the robot using the specific tool and the first information indicating the force generated between the first tool and the object in the trial motion using the first tool, using a convolutional neural network.

5. The information processing device according to claim 1, wherein the first tool is a different type of tool than the specific tool.

6. An information processing method executed by a processor, the method comprising:
   determining a specific task that is desired by a user by using artificial intelligence to recognize a voice instruction of the user;
   acquiring first information indicating a force generated between a first tool and an object in a trial motion in which a robot uses the first tool; and
   estimating information that is used by the robot to execute the specific task using the first tool based on the first information that was acquired and second information indicating a force generated between a specific tool and the object in performing the specific task by the robot using the specific tool,
   wherein the first tool is an alternative to the specific tool.

7. The information processing method according to claim 6, wherein the first tool is a different type of tool than the specific tool.

8. A non-transitory storage medium storing a program that causes a computer to execute processes comprising:
   determining a specific task that is desired by a user by using artificial intelligence to recognize a voice instruction of the user;
   acquiring first information indicating a force generated between a first tool and an object in a trial motion in which a robot uses the first tool; and
   estimating information that is used by the robot to execute the specific task using the first tool based on the first information that was acquired and second information indicating a force generated between a specific tool and the object in performing the specific task by the robot using the specific tool,
   wherein the first tool is an alternative to the specific tool.

9. The non-transitory storage medium according to claim 8, wherein the first tool is a different type of tool than the specific tool.

* * * * *